Patented May 24, 1949

2,470,761

UNITED STATES PATENT OFFICE

2,470,761
SOLVENTS AND PLASTICIZERS FOR VINYL RESINS

Jean Delorme, Bron, and René Bluma, Asnières, France, assignors to Société Anonyme des Manufactures des Glaces et Produits Chimiques de Saint-Gobain, Chauny & Cirey, Paris, France No Drawing. Application May 21, 1945, Serial No. 595,078. In France July 30, 1943

Section 1, Public Law 690, August 8, 1946
Patent expires July 30, 1963

2 Claims. (Cl. 260—32.8)

The present invention has for its object solvents and plasticizers for vinyl resins.

It is already known that for organic polyvinyl esters such as polymerised vinyl acetate, and their acetalisation derivatives such as polyvinyl formals, acetals, butyrals, there exists a great variety of solvents and plasticizers that dissolve or plasticize said polyvinyl esters comparatively easily.

But for polyvinyl chloride there is only a small number of solvents and plasticizers particularly in the case of true solvents and it is very difficult to succeed in dispersing polyvinyl chloride under profitable conditions. In fact most of these known solvents are heavy and with a low vapor pressure; in the case of comparatively light solvents such as chlorobenzene, gels are produced with comparatively low concentrations of polyvinyl resin, and such solvents are strongly retained by the resin. In both cases difficulties arise in drying the materials when applied as films, or varnishes.

For polyvinyl chloride no light solvent has yet been found that does not produce gels at ambient température and comparatively high concentrations or that will completely evaporate when applied as a solution without being retained in the meshes of the network formed by the resin.

We have found that aldehydes and their substitution derivatives are good solvents of polyvinyl chloride. Excellent results are obtained with saturated aliphatic aldehydes containing at least four carbon atoms (butyraldehyde), with aromatic aldehydes as well as with organic products having an active aldehydic function such as aldehydes-phenols (for instance salicylaldehyde), with heterocyclic aldehydes such as furfuraldehyde, with ethylenic aldehydes such as crotonic aldehyde, with halogenated aldehydes such as chloral, chlorobenzaldehyde, with nitrated aldehydes such as nitrobenzaldehyde, with terpenoid aldehydes such as citronellal, with sulfur containing aldehydes such as tri-thioacetaldehyde or with dialdehydes and their derivatives such as chloromalonic dialdehyde.

We ascertained that for aliphatic aldehydes, such as butyraldehyde and isovaleric aldehyde, a complete solution of the polyvinyl chloride is obtained in the neighbourhood of the boiling point.

Among aromatic aldehydes, benzaldehyde disperses the polyvinyl chloride at ambient temperature while giving a very viscous solution which fluidifies when and as the temperature rises and thereafter keeps an excellent fluidity even at a high concentration.

All dispersions thus obtained are stable, no precipitation of the polyvinyl chloride occurring during the cooling of such solutions.

We noted that, with the ketones such as methylcyclohexanone and mesityloxide which are known as solvents of polyvinyl chloride, the gelification is much more rapid than with benzaldehyde or other similar aldehydes.

In a general way, aldehydes produce, without heating, solutions which are much more fluid at ambient temperature than those obtained under the same concentration with most of the other known solvents; in other words with equal viscosity it is possible to dissolve much more polyvinyl chloride in an aldehyde than in any other known solvent.

In that way solutions have been obtained which could still flow at ambient temperature, while reaching concentrations of about 25% of polyvinyl chloride.

Our invention has special interest for the preparation of varnishes, glues, films, etc. where the solutions required as mother solutions must be as concentrated as possible. This is particularly important in the case of adhesive products.

Excellent glues have thus been prepared for sticking sheets of polyvinyl chloride on a metallic surface, by using dispersions of 15% of polyvinyl chloride in benzaldehyde or other aldehydes.

It is also possible to obtain rapidly drying varnishes applicable with a spray gun and usable for varnishing metals or wood, etc. by using dispersions of 10 or 12% of polyvinyl chloride in butyraldehyde, with or without a plasticizer.

What is claimed is:

1. A glue adapted inter alia to use in sticking polyvinyl chloride sheets on metallic surfaces consisting essentially of benzaldehyde containing about 15% polyvinyl chloride.

2. A composition from which the solvent may be substantially completely removed, that is adapted to use as a glue or varnish consisting essentially of a clear, ungelled solution of polyvinyl chloride and benzaldehyde.

JEAN DELORME.
RENÉ BLUMA.

REFERENCES CITED

The following references are of record in the file of this patent:

UNITED STATES PATENTS

| Number | Name | Date |
|---|---|---|
| 2,273,682 | Wolf | Feb. 17, 1942 |
| 2,362,376 | Heymann | Nov. 7, 1944 |
| 2,413,294 | Curtis | Dec. 31, 1946 |

OTHER REFERENCES

Page 6, Vinylite Resins, their Forms, Properties and Uses, 1942, Carbide and Carbon Chemicals Corp., New York, N. Y.